United States Patent [19]

Fukata

[11] 4,216,843
[45] Aug. 12, 1980

[54] ALL-WHEEL-DRIVE TYPE VEHICLE FOR CONSTRUCTION WORK

[75] Inventor: Akio Fukata, Izumi, Japan

[73] Assignee: Kubota, Ltd., Osaka, Japan

[21] Appl. No.: 942,526

[22] Filed: Sep. 15, 1978

Related U.S. Application Data

[63] Continuation-in-part of Ser. No. 787,398, Apr. 14, 1977, abandoned.

[51] Int. Cl.² .................................................. B60K 17/16
[52] U.S. Cl. .................................... 180/245; 180/256
[58] Field of Search ................ 180/43 A, 44 R, 49, 180/75, 233, 245, 254, 256; 74/421, 412, 413

[56] References Cited

U.S. PATENT DOCUMENTS

| | | | |
|---|---|---|---|
| 1,119,196 | 12/1914 | Siebert | 74/421 R |
| 3,093,417 | 6/1963 | Bixby | 180/75 X |
| 3,255,840 | 6/1966 | Tangen | 180/75 X |
| 3,266,591 | 8/1966 | Sampietro et al. | 180/44 R X |
| 3,709,314 | 1/1973 | Hickey | 180/44 R |
| 3,963,089 | 6/1976 | Crawford | 180/75 |

*Primary Examiner*—John J. Love
*Assistant Examiner*—Michael Mar
*Attorney, Agent, or Firm*—Jordan and Hamburg

[57] ABSTRACT

A vehicle with a pair each of front and rear wheels. Every wheel has respective reduction gearing operatively connected with a common driving engine. Either one of the front and rear pairs is a pair of dirigible wheels, and the reduction gearing for these dirigible wheels are both of inscribed gearing construction, while the reduction gearing for the remaining non-dirigible wheels are both of circumscribed gearing construction.

1 Claim, 2 Drawing Figures

ALL-WHEEL-DRIVE TYPE VEHICLE FOR CONSTRUCTION WORK

REFERENCE TO RELATED APPLICATION

This is a continuation-in-part of application Ser. No. 787,398, filed Apr. 14, 1977, now abandoned.

BACKGROUND OF THE INVENTION

The present invention relates to an all-wheel-drive type vehicle for construction work.

As the driving mechanism for an all-wheel-drive type vehicle for construction work, it is conventional to adopt the so-called inscribed gearing construction for each of the respective reduction gearing means provided for every wheel close to same as the terminal gearing to receive power from the respective front or rear differential gearing. More specifically, an outwardly located annular gear is fixed to and rotates with the wheel, while a center gear is fixed to and rotates with the driving axle extending from the differential gearing as one of the output shafts thereof, and a plurality of intermediate gears are provided, on respective shafts journaled in fixed positions, for free rotation in meshing with both the annular gear and the center gear.

Such general adoption of the inscribed gearing construction is based perhaps on the common recognition of the compactness of the over-all mechanism, compatibility with the requirement of obtaining a wide steering angle range of the dirigible wheels, and the advantage of adopting as many unified parts as possible both in reducing the costs and in simplifying the design.

However, the inscribed gearing construction is of rather complicated structure and is therefore still expensive even if adopted as the common unified parts. Another drawback of the inscribed gearing construction resides in that the level of the driving axles is substantially the same as the center of the wheels, without possibility of freely raising same, thus leaving the risk of damaging the differential and axle housings, especially in the case of the non-dirigible wheels which are normally to support a heavier load than the dirigible wheels and are thus apt to sink down into the soil.

SUMMARY OF THE INVENTION

For elimination of the drawbacks of the conventional structure, the all-four-wheel-drive type vehicle for construction work is according to the present invention characterized in that either one of the front and rear pairs of the wheels is a pair of dirigible wheels and respective reduction gearing means provided for each of these dirigible wheels close to same are both of the conventional inscribed gearing construction, while respective reduction gearing means provided for each of the remaining non-dirigible wheels close to same are both of circumscribed gearing construction.

With such provision of the circumscribed gearing construction for the non-dirigible wheels and of the inscribed gearing construction for the dirigible wheels, a very favorable vehicle for engineering works has now been obtained, which is far from any disadvantage with respect to the costs, which suffers from no restriction of the wide steering angle range of the dirigible wheels and which minimizes the risk of damage even if the non-dirigible wheels may somewhat sink down into the soil under a heavy load.

Though the reduction gearing means of two different types are now adopted in contrast with the use of the inscribed gearing construction as the unified parts in the conventional vehicles, the circumscribed gearing construction is quite more inexpensive than the inscribed gearing construction, and thus the cost of the over-all vehicle is now rather somewhat lower than the conventional vehicles. The provision of the inscribed gearing construction for the dirigible wheels retains the advantage of the wide steering angle range of the dirigible wheels, while the provision of the circumscribed gearing construction for the non-dirigible wheels, which are heavily loaded and are therefore apt to sink down in the soil, makes it possible to provide the driving axles for these non-dirigible wheels on a proper high level thus to insure safe working even on soft, unstable land or on an irregular field.

Because the braking mechanism is normally incorporated in the non-dirigible wheels, it is another advantage of adopting here the circumscribed gearing construction, to be able to incorporate the braking mechanism making use of the substantial free space near the first gear to receive the driving input, thus requiring little additional space and avoiding making the construction very much complicated.

DESCRIPTION OF THE PREFERRED EMBODIMENTS

Figure 1:
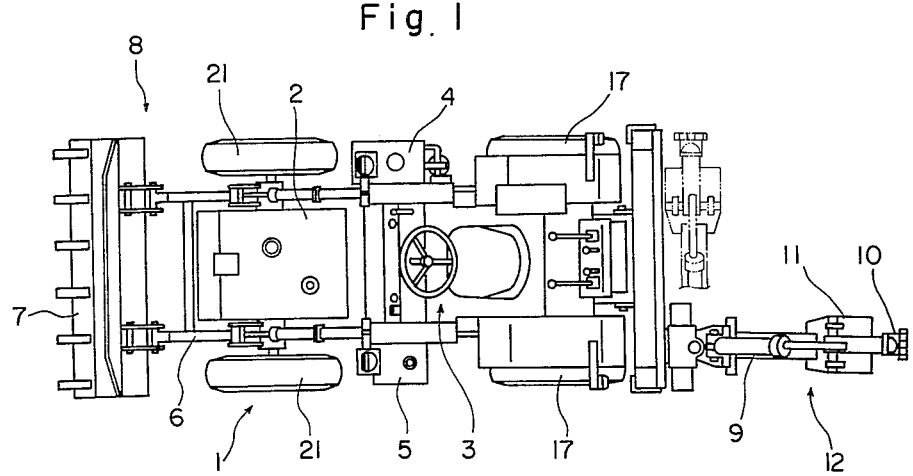
FIG. 1 is an over-all plan view of the vehicle according to the present invention.

How the present invention is effected is now described in detail with reference to the drawings. FIG. 1 shows in non-limitative manner an all-four-wheel-drive type vehicle with shovel and backhoe, with the body designated generally at 1. As illustrated, the vehicle comprises an engine 2 mounted on the front side; driving station designated generally at 3; tanks 4 and 5 for the hydraulic oil and fuel, respectively, on either side of the driving station 3; a shoveling apparatus designated generally at 8 provided outwardly on the front end, comprising arms 6 which may hydraulically be raised and lowered and a shovel 7 which may in turn be pivotally swung on the arms 6; and a digging apparatus designated generally at 12 provided outwardly on the rear end, comprising a boom 9 which may be raised and lowered on a supporting table which may laterally slide and may be retained in any such lateral sliding position, an arm 10 which may be pivotally swung on the tip of the boom 9, and a bucket 11 which may in turn be pivotally swung on the tip of the arm 10.

Figure 2:
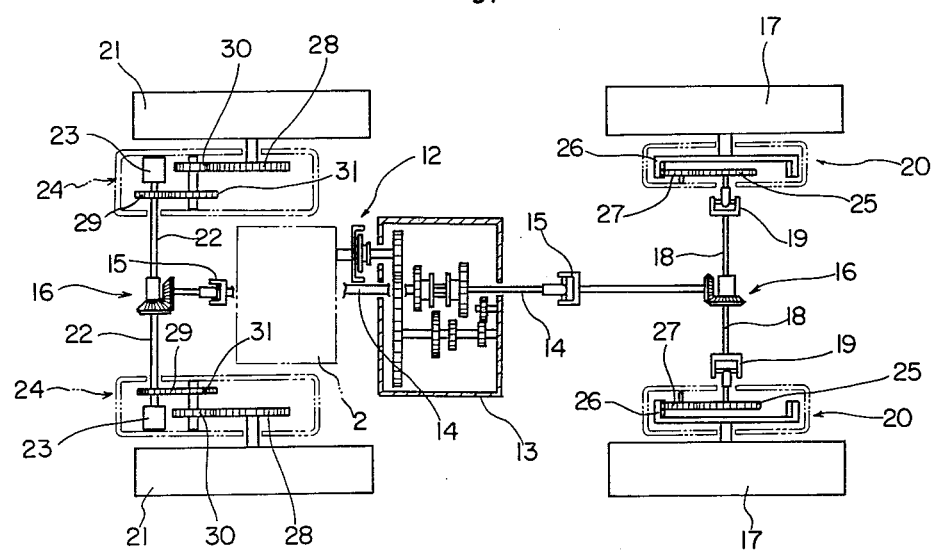
FIG. 2 is a schematic diagram of the driving mechanism of the vehicle shown in FIG. 1.

A driving mechanism for the vehicle 1 is shown in FIG. 2. Power from the engine 2 is transmitted, via a clutch 12, to a transmission gearing 13. Power take-off shafts 14 on either side of the transmission gearing 13 are connected, via respective universal joints 15, with front and rear differential gearings 16, respectively.

Looking first to the rear portion with a pair of wheels 17, axles 18 extending on either side are connected, via respective universal joints 19, with right and left reduction gearing means 20, respectively, of the identical inscribed gearing construction. Each gearing means 20 comprises a center gear 25 fixed to the output shaft of the universal joint 19 thus to rotate with the axle 18, an outwardly located annular gear 26 fixed to the rear wheel 17 thus to rotate therewith, and a plurality of intermediate gears 27 on respective shafts journaled on a fixed housing of this gearing means 20 shown in phantom in FIG. 2, freely to rotate thereon in meshing with both the center gear 25 and the annular gear 26. In this illustrated instance, these rear wheels 17 are supposed to be the dirigible wheels.

Looking now to the front portion with a pair of wheels 21, axles 22 extending on either side are connected with right and left reduction gearing means 24, respectively, of the identical circumscribed gearing construction. Each gearing means 24 comprises a gear 28 fixed to the front wheel 21 thus to rotate therewith, a gear 29 located radially outwardly of the said gear 28, in staggered position in the illustrated instance, fixed to axle 22, namely output shaft of the front differential gearing 16, and intermediate, i.e., idler, gearing means fixed on a shaft journaled on the housing of this reduction gearing means 24 shown in phantom in FIG. 2, comprising in the illustrated example, an idler gear 30 in mesh with the gear 28 and an idler gear 31 in mesh with the gear 29, thus operatively connecting the two gears 28 and 29. The center of the idler gear 30 is above the center of the gear 28 and the center of the idler gear 31 is below the center of the gear 29 in order that the axle 22 be disposed as high as possible.

Designated at 23 is a braking mechanism provided in the gearing means 24. As seen, the engine 2 is mounted on the side of these non-dirigible wheels 21 provided with the circumscribed gearing construction 24.

Alternately to the embodiment as illustrated, another embodiment may as well be constructed with opposite arrangement of the two types of the reduction gearing means, namely with provision of the universal joints on the axles 22 of the front wheels 21 which in this instance are supposed to be dirigible wheels and for which are provided respective reduction gearing means of inscribed gearing construction, while for the rear wheels 17, which are now non-dirigible wheels, are provided respective reduction gearing means of circumscribed gearing construction.

What I claim is:

1. An all-wheel-drive vehicle for construction work, comprising a pair of front wheels, a pair of rear wheels, one of said pairs of wheels being dirigible and the other of said pairs of wheels being non-dirigible, an engine located over the non-dirigible wheels, respective drive axles for the dirigible and the nondirigible wheels, the drive axle for the dirigible wheels being coaxial with the axis of said dirigible wheels, means interposed between the engine and the axles for transmitting power from the engine to the axles, respective reduction gearing means interposed between the axles and the wheels for transmitting power from the axles to the wheels, each of the reduction gearing means for the dirigible wheels including inscribed gearing and each of the reduction gearing means for the non-dirigible wheels comprising a circumscribed gear fixed to the wheel to rotate therewith, a circumscribed gear fixed to the axle to rotate therewith and circumscribed idler gear means meshing with the gear fixed to the wheel and the gear fixed to the axle, the gear fixed to the wheel being located below and the gear fixed to the axle being located above the idler gear means.

* * * * *